Figure 3A:
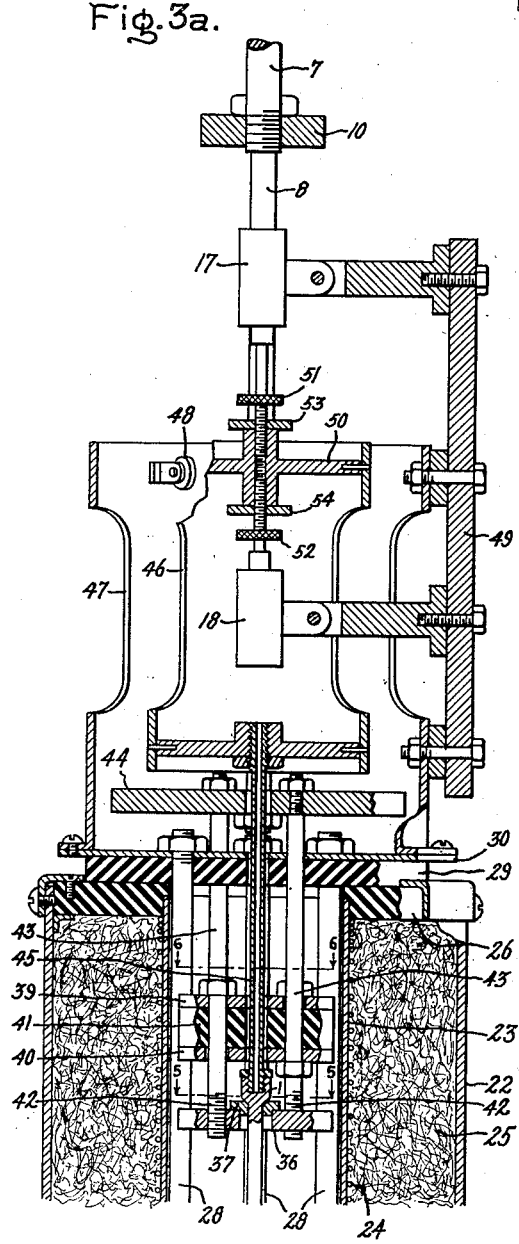

Dec. 19, 1950  J. D. LUBAHN  2,534,980
TENSILE TESTING APPARATUS
Filed May 27, 1949  4 Sheets-Sheet 1
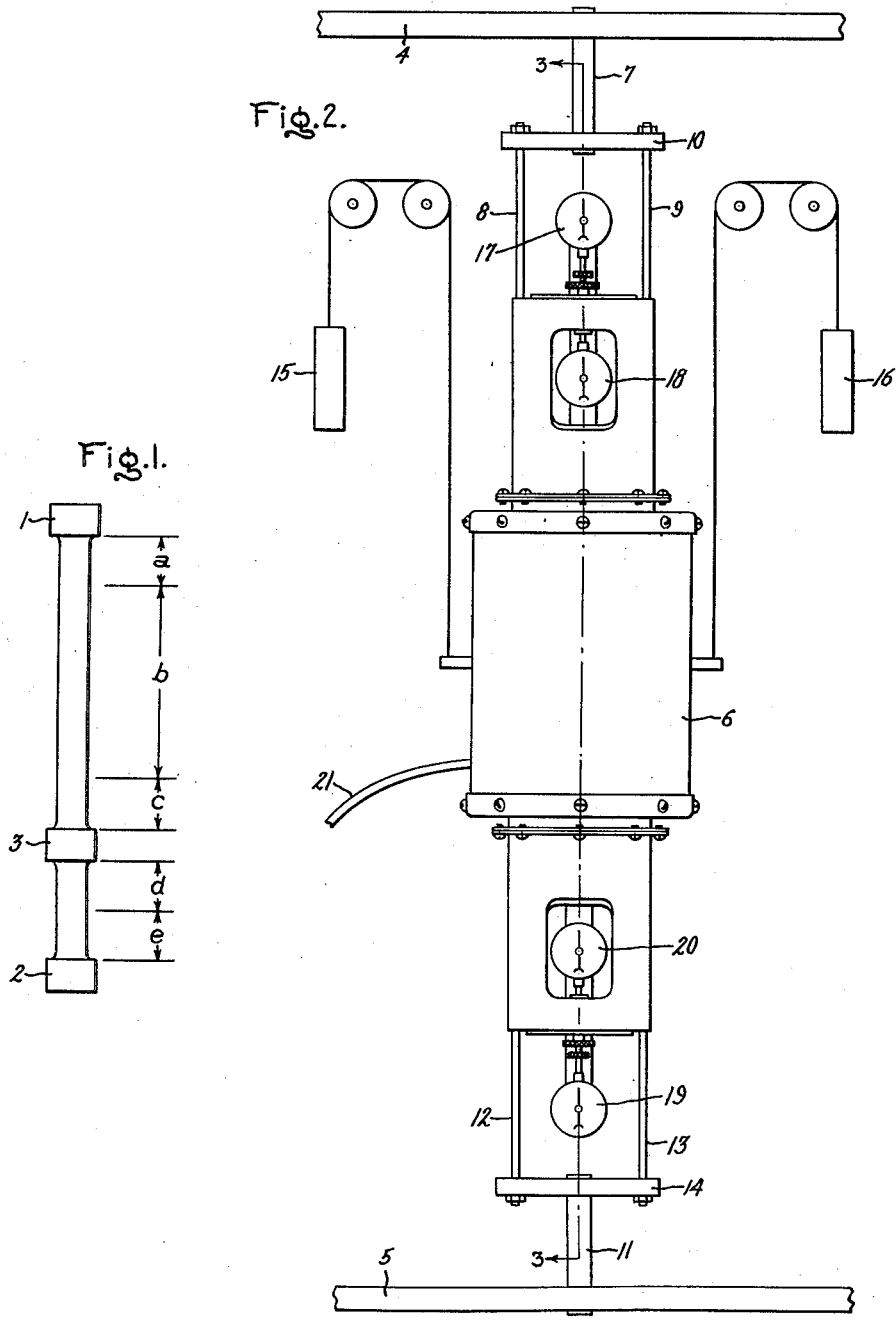
Inventor:
Jack D. Lubahn,
by Richard E. Haley
His Attorney.

Dec. 19, 1950  J. D. LUBAHN  2,534,980
TENSILE TESTING APPARATUS
Filed May 27, 1949  4 Sheets-Sheet 2

Inventor:
Jack D. Lubahn,
by Richard E. Haley
His Attorney.

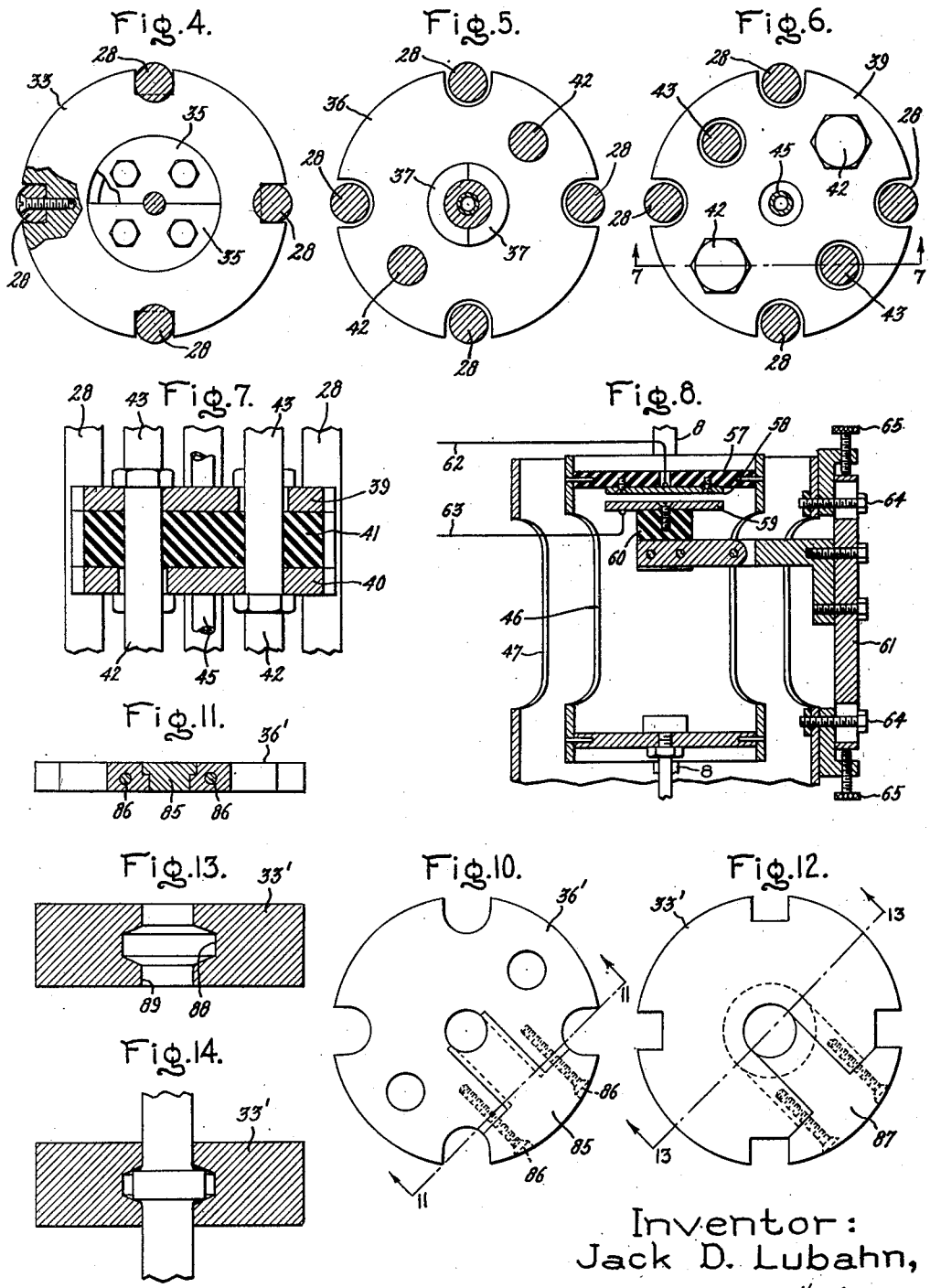

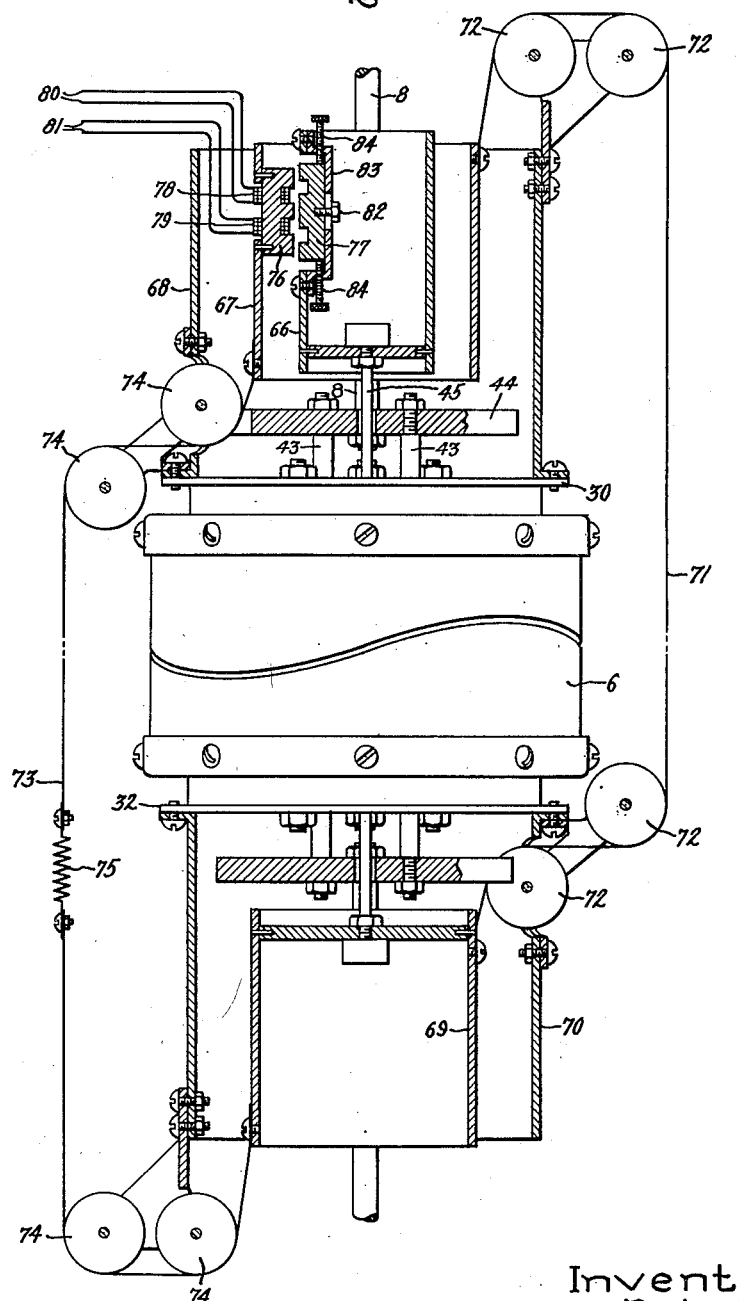

Patented Dec. 19, 1950

2,534,980

UNITED STATES PATENT OFFICE 2,534,980

TENSILE TESTING APPARATUS

Jack D. Lubahn, Schenectady, N. Y., assignor to General Electric Company, a corporation of New York Application May 27, 1949, Serial No. 95,817

7 Claims. (Cl. 73—15.6)

This invention relates to tensile testing of materials, and in particular to an improved test specimen and fixtures for making tensile tests.

Tensile tests of material are commonly made with specimens of the material which have been carefully machined to a standard size and shape. These specimens may be in the form of a rod at each end of which is an enlargement or head having a diameter somewhat greater than that in other, or reduced, portions of the specimen. The two heads are connected by suitable means between crossheads of a testing machine. As the crossheads move apart, tensile load is applied to the specimen. Suitable means are provided for measuring the load applied and the elongation of a selected part of the specimen, from which measurements the stress vs. strain characteristics of the material may be determined.

The stresses and consequent strains are not uniform in those portions of the specimen near the heads. For this reason gauge points are usually selected at some distance from each end of the specimen, and elongation is measured between these gauge points by a strain gauge or other suitable means.

In making test at elevated temperatures, the specimen must be enclosed in a furnace. When this is done, the gauge points are relatively inaccessible, and the accurate measurement of large strains becomes very difficult. The same problem arises when tests are made at reduced temperatures which require cooling of the specimen, and in other cases where it is necessary or desirable to enclose the specimen. For tests which include large strain values, the attachment of gauges or fixtures to the gauge points of the specimen is complicated by the reduction in cross-section which occurs as the specimen is elongated. Rigid clamping-on devices are good only to about 1% strain because of loosening as the specimen becomes thinner; spring clamps are unsuitable at elevated temperatures; and screwed-on pieces or welded-on pieces affect the specimen itself and its behavior.

An object of this invention is to provide improved means for measuring strain in specimens tested at elevated temperatures, or when the specimen is enclosed for other reasons.

Another object is to provide an improved fixture for measuring the elongation of a portion of a test specimen which remains firmly and accurately attached regardless of changes in cross-section of the portions of the specimen tested.

Other objects and advantages will become apparent as the description proceeds.

Figure 3B:
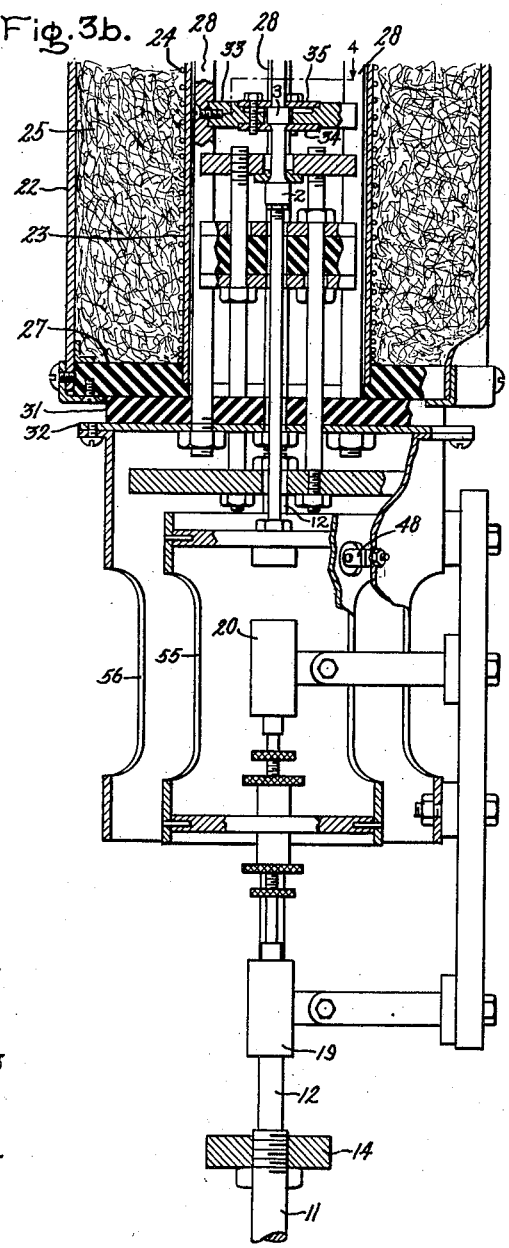

For a better understanding of the invention, reference is made in the following description to the accompanying drawings, in which Fig. 1 is an elevation of a three-headed specimen used in carrying out this invention; Fig. 2 is an elevation of a test fixture embodying principles of this invention, attached between crossheads of a testing machine; Figs. 3a and 3b are a section approximately along line 3—3 of Fig. 2, 3a being the upper part and 3b the lower part; Fig. 4 is a view along line 4—4, Fig. 3b; Fig. 5 is a view along line 5—5, Fig. 3a; Fig. 6 is a view along line 6—6, Fig. 3a; Fig. 7 is a section along line 7—7, Fig. 6; Fig. 8 is a section showing an alternate form of strain gauge apparatus which may be used in test fixtures embodying the principles of this invention; Fig. 9 is an elevation, partly in section, of another alternate form of gauging apparatus; Fig. 10 is a plan view of an alternate movable transverse member; Fig. 11 is a section along line 11—11, Fig. 10; Fig. 12 is a plan view of an alternate fixed transverse member; Fig. 13 is a section along line 13—13, Fig. 12; and Fig. 14 is a section similar to Fig. 13 but showing a specimen in place. Where the same or an identical part appears in more than one figure of the drawings, it is represented at each appearance by the same reference number. Slightly modified parts in alternative construction are indicated by a prime following the reference number.

Refer now to Fig. 1, which shows a test specimen having three heads 1, 2, and 3. Heads 1 and 2 are at respective ends of the specimen, while head 3 is between the two ends and divides the specimen into two portions having unequal lengths. The two portions are identical except as to length; that is, they have equal diameters and are composed of the same material. The heads may have the form of buttonheads, as illustrated and hereinafter described, or they may be threaded or have any other form suitable for attachment to testing machine fixtures.

When this specimen is used in a tensile test, heads 1 and 2 are connected to respective crossheads of the testing machine, through elements of a fixture hereinafter described. As the crossheads move apart tensile load is applied to the entire specimen. The stress distribution, and hence the strain, in portions a, c, d, and e, adjacent the heads, is non-uniform; but since the two portions of the specimen are identical except as to length, the elongation of portions a and c is the same as the elongation of portions e and d, respectively. If elongation is measured between head 1 and head 3, and also between head 2 and head 3, the difference in amount of the two elongations measured is equal to the elongation of portion b. Since all parts of portion b are relatively remote from any of the heads, the strain in this portion is uniform at all values below that at which necking of the specimen begins. Thus, with a three-headed specimen as described, accurate strain determinations can be made from measurements taken between the heads of the specimen.

Refer now to Fig. 2, which shows a test fixture embodying principles of this invention. The fixture is shown connected between crossheads 4 and 5 of a testing machine. A furnace 6 encloses the specimen for testing at elevated temperatures. Since the specimen is inside the furnace it is not visible in this view. As explained more fully hereinafter, center head 3 of the specimen is held in fixed position relative to furnace 6. Head 1 is connected to crosshead 4 through rods 7, 8, and 9 and cross-member 10. Head 2 is connected to crosshead 5 through rods 11, 12, and 13 and cross-member 14. As the crossheads move apart, tensile load is applied to the specimen. The weight of furnace 6, including everything attached to it except those parts attached through the specimen only, is balanced, by counter weights 15 and 16 for example, so that the only load applied to the specimen is that due to motion of crossheads 4 and 5.

The amount of elongation between heads 1 and 3 is indicated by dial gauges 17 and 18, while the amount of elongation between heads 2 and 3 is indicated by dial gauges 19 and 20. The elongation of portion b of the specimen is the difference between the readings of these two sets of gauges. Gauges 18 and 20 may be very accurate gauges for indicating a small range of values, while gauges 17 and 19 may be less accurate gauges for indicating a wider range of values, as hereinafter explained. Electric cable 21 is connected to a source of electric power and to resistance elements within the furnace, which provide the heat necessary for testing at elevated temperatures.

Refer now to Figs. 3a and 3b, which show a vertical section through the test fixture shown in Fig. 2. In places the sectioning departs somewhat from the plane of line 3—3, Fig. 2, to better illustrate the details of construction.

The furnace comprises an outer metal cylinder 22 and an inner metal cylinder 23. For example, cylinder 22 may be made of sheet steel and cylinder 23 may be made of Alundum. Resistance wire 24 is wound about cylinder 23, and provides heat to maintain elevated temperatures within the furnace. Successive turns of the resistance wire are spaced somewhat closer together near the ends of the furnace than at the center, to help compensate for the greater loss of heat through the metal members which pass through the ends of the furnace and thus provide more uniform temperatures along the length of the specimen. The space between cylinders 22 and 23 is filled with loose heat-insulating material 25, and this space is closed at each end of the furnace by rings 26 and 27, which preferably are also made of heat-insulating material, Transite for example.

Cylinder 23 encloses a cylindrical inner chamber which extends axially through the length of the furnace. Extending axially through this inner chamber are four fixed rods 28. These rods pass through end plates 29, 30, 31 and 32 at respective ends of the furnace, and are threaded at their ends to receive nuts which hold the rods, the furnace, and the end plates together as a rigid unit, which, however, may be disassembled readily by removing the nuts. End plates 29 and 31 are preferably made of heat-insulating material, while end plates 30 and 32 may be made of metal, brass for example.

A fixed transverse member 33, which is preferably a circular steel disc, is rigidly attached to the four fixed rods. Member 33 has a hole in its center which is large enough for the buttons of the test specimen to pass through. Two circular collars 34 and 35, each of which has a center hole with a diameter substantially equal to that of reduced sections of the test specimen and hence smaller than the diameter of head 3, are secured to opposite sides of member 33 by bolts as shown. Head 3 is placed inside the hole in member 33, and collars 34 and 35 are then bolted in place to hold head 3 in a fixed position relative to member 33, and hence relative to the furnace. Collars 34 and 35 are split into two or more sections to facilitate assembly, and to permit the inner edge of collar 35 to engage head 3 of the specimen firmly. Member 33 is recessed beneath collar 35, with a shoulder at the outer edge of the recess, so that only the outer edge of each section of collar 35 is in contact with member 33. The inner edges of these sections press against the shoulder of head 3, so that when the bolts are tightened, head 3, member 33, and rods 28 are firmly connected together.

A moving transverse member 36, which may be a steel disc, is connected to head 1 through split collar 37. Member 36 has a hole through its center which is large enough for the heads of the specimen to pass through. Collar 37 has an outer diameter which is too large to pass through the hole in member 36, and has an inner diameter which is substantially equal to the diameter of reduced sections of the specimen, hence is smaller than the diameter of head 1. Thus when collar 37 is in position, head 1 cannot pass through the hole in member 36, and tensile load can be transmitted to the specimen through the moving transverse member. Collar 37 is split into two halves to facilitate assembly.

An insulating sandwich is provided to reduce heat transfer from that portion of the furnace containing the specimen toward the ends of the furnace. This aids in maintaining the temperature of the specimen uniform along its length and at the desired value. The insulating sandwich comprises two transverse metal plates 39 and 40 between which there is a plate of heat-insulating material 41. The sandwich fills substantially the entire cross-section of the furnace inner chamber, and is axially movable therein. Two rods 42 are connected to member 36, pass through the sandwich and are connected to its outer metal plate 39. Two other rods 43 pass through the end of the furnace and through the sandwich, and are connected to its inner metal plate 40. At their outer ends, rods 43 are connected to a steel plate 44, to which rods 8 and 9 are also connected.

As the crossheads of the testing machine move apart, tensile load is transmitted through rod 7, cross-member 10, rods 8 and 9, plate 44, rods 43, the insulating sandwich, rods 42, and transverse member 36, to head 1 of the test specimen. It may be noted that the heat-insulating material in the sandwich in subject to compressive loading only. Sufficient clearance is provided where rods 43 pass through the end plates, so that the rods may be moved freely relative to the furnace without friction.

An unstressed rod 45 extends through the end of the furnace and is screwed, by means of threads at its end, directly into a tapped hole provided for the purpose in the end of head 1 of the test specimen. A lock nut is provided which may be tightened against the end of the specimen to prevent any lost motion in the threads.

Sufficient clearance is provided where rod 45 passes through the end plates of the furnace and through the insulating sandwich, so that it may move freely without friction. Since substantially no stress is applied to rod 45, all portions of this rod move relative to the furnace by amounts equal to the elongation of the specimen between heads 1 and 3. Rod 45 may be hollow, as shown, so that thermocouple wires may be inserted through the rod to measure temperature of the specimen.

Adjacent to the end of the furnace is a nest of coaxial cylinders 46 and 47. Bearings 48, which are preferably small rollers, mounted upon ball bearings themselves, are provided to maintain radial alignment of the coaxial cylinders, while permitting free, substantially frictionless relative axial movement of the cylinders. Preferably there are at least two rows of these bearings, each row having four bearings spaced 90° apart around the cylinders.

The outer cylinder 47 of the nest is rigidly attached to end plate 30 of the furnace. Inner cylinder 46 is attached to rod 45, for example by screw threads and a lock nut to prevent lost motion as shown. Consequently, the relative axial displacement of the two cylinders is exactly equal to the elongation of the specimen between heads 1 and 3 when tensile load is applied to the specimen. Rods 8 and 9 pass between the inner and outer cylinders of the nest.

A bracket 49 supports dial gauges 17 and 18, and is rigidly attached to outer cylinder 47. Inner cylinder 46 is provided with an end plate 50 to which two thumb screws 51 and 52 are attached. The pins or gauges 17 and 18 rest upon the respective heads of these two thumb screws. Before a load is applied to the specimen, thumb screws 51 and 52 preferably are adjusted until the pin of gauge 17 is near its position of maximum travel outward and the pin of gauge 18 is near its position of maximum travel inward. Locking nuts 53 and 54 are then tightened to hold the thumb screws in position. As tensile load is applied to the specimen, cylinder 46 is displaced relative to cylinder 47 by amounts exactly equal to the elongation of the specimen between heads 1 and 3, as has been explained, and changes in the indications of gauges 17 and 18 measure this displacement. Dial gauge 18, which starts with its pin all the way in at the beginning of the test, may be a $1/10,000''$ gauge with $\frac{1}{10}''$ maximum travel. This gauge measures small displacements with great accuracy. Dial gauge 17 may be a $1/1,000''$ gauge with a $1''$ travel. This gauge measures with sufficient accuracy displacements which are beyond the range of gauge 18. If desired, dial gauge 17 may be adjusted with its pin $\frac{1}{10}''$ away from thumb screw 51 at the beginning of the test. The total displacement is then the sum of the readings of the two gauges, and displacements up to $1\frac{1}{10}''$ may be measured.

The lower part of the fixture is identical to the upper part which has just been described; except that connections are made to head 2 of the specimen, and therefore the displacement of inner cylinder 55 relative to outer cylinder 56 is equal to the elongation of the specimen between heads 2 and 3. The amount of this elongation is indicated by dial gauges 19 and 20.

Refer now to Fig. 4, which is a plan view of fixed transverse member 33. A portion of the left-hand side of the figure has been cut away to show details of the construction. It may be noted that member 33 is rigidly attached to each of the rods 28, for example by screws as shown. The shoulder upon which the outer edge of each section of collar 35 rests is shown beneath the cutaway portion of the collar. The inner edge of the collar firmly engages the shoulder of head 3 when the bolts are tightened.

Refer now to Fig. 5, which is a plan view of moving transverse member 36. Note that there is ample clearance between member 36 and rods 28 to permit free relative axial motion. The relative positions of the specimen, collar 37, rods 28, and rods 42 are shown in this view.

Refer now to Fig. 6, which is a plan view of the insulating sandwich, and to Fig. 7, which is a section along line 7—7, Fig. 6. Note that although the sandwich substantially fills the inner chamber of the furnace, there is still sufficient clearance between the sandwich, rods 28, and rod 45 to allow free relative axial motion. Also, clearance is provided between rods 42 and plate 40, and between rods 43 and plate 39, as shown, to prevent having a continuous metal path through the sandwich which could transmit heat away from the specimen.

It will be appreciated that various gauging means may be used to measure relative axial displacement of the inner and outer cylinders of each nest. In particular, various types of electric strain gauge may be used to provide remote indications if desired.

Refer now to Fig. 8, which shows one method of installing a capacitance-type electric strain gauge. Inner cylinder 46 is provided with an end plate 57 of electrically insulating material. A metal disc 58 is attached to the under side of end plate 57. A second metal disc 59 is supported a short distance below disc 58 by a block of electrically insulating material 60 and a bracket 61 which is attached to cylinder 47. When a tensile load is applied to the specimen, and cylinder 46 moves relative to cylinder 47, plates 58 and 59 move farther apart. This produces a decrease in capacitance between the two plates. Leads 62 and 63 respectively connect the two plates to a conventional electric strain gauge circuit, which may be calibrated to measure the capacitance changes in terms of strain of the specimen tested. With this type gauge, zero adjustment may be made by slightly loosening bolts 64, which extend through slots in bracket 61, and then turning thumb screws 65 to adjust the position of bracket 61 and hence the spacing between plates 58 and 59. When the strain gauge circuit indicates zero strain, bolts 64 are tightened to hold bracket 61 in place.

This type of gauge has the attractive characteristic that it is most sensitive at small values of strain, where accurate readings are usually most desirable. By placing plates 58 and 59 very close together at the initial or zero setting, very great sensitivity may be obtained for small strain values.

It is also possible to modify the apparatus so that the two values of elongation measured between respective heads of the specimen are subtracted automatically in the apparatus. For example, if electric strain gauges having linear characteristics are available, two strain gauges may simply be connected in series bucking relation to give the difference in elongation; or, the two signals may be sent to suitable auxiliary apparatus which performs the subtraction.

Refer now to Fig. 9, which shows a mechanical arrangement for subtracting one elongation value from the other. The furnace 6 and all the parts located inside the furnace may be identical with those shown in Fig. 3. At one end of the furnace there is a nest of three coaxial cylinders 66, 67, and 68. Bearings are provided to maintain these cylinders in radial alignment while permitting relative axial movement, similar to those shown and described with the apparatus of Fig. 3. The inner cylinder 66 is connected to unstressed rod 45, which is connected in turn to head 1 of the test specimen. The outer cylinder 68 is rigidly attached to end plate 30 of the furnace.

At the other end of the furnace is a nest of two coaxial cylinders 69 and 70. These cylinders are also provided with bearings which maintain their radial alignment while permitting relative axial motion. Inner cylinder 69 is attached to the unstressed rod connected to head 2 of the specimen. Outer cylinder 70 is firmly attached to end plate 32 of the furnace.

A thin metal tape 71 supported by pulleys 72, as shown, is connected between the inner end of cylinder 69 and the outer end of cylinder 67. A similar tape 73 supported by pulleys 74 is connected between the inner end of cylinder 67 and the outer end of cylinder 69. A spring 75 may be provided to maintain the tension of the tapes constant. As cylinder 69 moves outward from the furnace, tape 71 pulls cylinder 67 outward by an equal amount. As cylinder 69 moves in toward the furnace, tape 73 pulls cylinder 67 toward the furnace by an equal amount.

As load is applied to the specimen, cylinder 66 moves outward relative to cylinder 68 by an amount equal to the elongation between heads 1 and 3 of the specimen, in the same manner as has been explained in connection with Fig. 3. Similarly, cylinder 69 moves outward relative to cylinder 70 by an amount equal to the elongation between heads 2 and 3 of the specimen. Because of the mechanical linkage, cylinder 67 moves outward relative to cylinder 68 by this same amount. Therefore, the displacement of cylinder 66 relative to cylinder 67 is equal to the elongation between heads 1 and 3 minus the elongation between heads 2 and 3. This difference in elongation can be measured by a single strain gauge connected between cylinders 66 and 67.

In Fig. 9 an inductance-type electric strain gauge is illustrated to measure relative changes in position between cylinders 66 and 67. This strain gauge comprises a three-legged magnetic core 76 and a three-legged iron armature 77. Two coils 78 and 79 are wound on respective sections of the three-legged core as shown. Armature 77 has its outer legs spaced a bit farther apart than the outer legs of core 76. As armature 77 is moved upward relative to core 76, the lower leg of the armature comes closer to the lower leg of core 76. This decreases the reluctance of the magnetic path through the lower part of the core, and thereby increases the inductance of coil 79. At the same time the upper leg of the armature moves farther from the upper leg of the core 76. This increases the reluctance of the upper part of the magnetic circuit, and thereby decreases the inductance of coil 78.

The two cells 78 and 79 are connected by leads 80 and 81 respectively into a conventional electric strain gauge circuit which measures changes in relative inductance of the two coils. Zero adjustment of the gauge is made by loosening screw 82 sufficiently for it to slide in its slot in mounting bracket 83. The position of the armature is then adjusted by turning thumb screws 84. When zero adjustment is obtained, screw 82 is tightened to hold armature 77 in place relative to cylinder 66.

In the fixtures which have been described, a considerable disassembly of the fixture is required to change test specimens. To facilitate changing specimens, the fixtures may be modified by placing a door in the side of the furnace through which specimens can be inserted and removed. This door, as well as the main body of the furnace, should contain heating elements so that a uniform temperature can be maintained in all parts of the inner chamber of the furnace. Electrical connections to the heating elements in the door may be through the door hinges. When this modification is employed, it is preferable to also modify transverse members 33 and 36, Fig. 3, by providing a removable portion in each of the transverse members, so that the specimen can be inserted laterally.

For example, movable transverse member 36 may be constructed as illustrated in Figs. 10 and 11, where the modified member is designated by reference character 36'. Referring to these two figures, member 36' has a radial slot extending from its inner hole to its outer edge. A wedge 85 fits inside this slot. When wedge 85 is removed, a test specimen may be inserted laterally through the slot into position within the center hole. Wedge 85 is then replaced, and holds the test specimen in position. Screws 86, or other suitable fastening means, are provided to hold the wedge in place in the slot.

The inner hole of member 36, within which the specimen is placed, may have a diameter substantially equal to that of reduced sections of the specimen, and therefore smaller than that of the specimen heads. Thus the heads cannot pass through the hole, and it is not necessary to use the split collars 37 shown in Fig. 3.

The two unstressed rods, 45 in Fig. 3, may have their ends threaded in opposite directions—that is, one may have right-hand threads while the other has left-hand threads. The specimen can then be fastened to both rods by turning the specimen to engage the threads on the two rods, and then tightening the lock nuts against the ends of the specimen.

Refer now to Figs. 12, 13 and 14, which show a similar modification of the fixed transverse member, 33 in Fig. 3. Fig. 12 is a plan view of the modified member, Fig. 13 is a diametric section along line 13—13, Fig. 12, and Fig. 14 is the same section with a test specimen in place, which shows how the specimen is held firmly in fixed position relative to the fixed transverse member. The modified transverse member, 33', has a radial slot through which head 3 of the specimen can be inserted. A wedge 87 fits in this slot, where it may be held by screws. The axial hole through the center of member 33' is shaped as shown, with an enlarged diameter at its center, 88, to accommodate head 3 of the specimen. The end portions 89 of this hole have diameters substantially equal to the diameter of reduced sections of the specimen. The top and bottom of enlarged portion 88 are tapered or wedge-shaped. Preferably, head 3 fits into this portion very snugly, so that some force is required to insert the specimen. This insures that the specimen will be held firmly, with no axial movement relative to member 33'.

It will be appreciated that other modifications of the transverse member may be made to accommodate other types of specimens. For example, members having threaded axial holes may be provided for use with specimens having threaded heads, or members having serrated jaws for holding rods or wire may be provided.

Where tests are to be made at reduced temperature, the furnace may be replaced by refrigerating apparatus. In other cases, the specimen may be enclosed in other apparatus suitable for the particular tests to be made. In each of these cases, a specimen and fixture similar in principle to those herein described may be used to measure the elongation of a portion of the specimen for which gauge points may be relatively inaccessible. Even when no enclosing apparatus is present, and gauge points would be accessible, fixtures of the type described offer the advantage that the connections between the gauges and the specimen are not affected by reductions in diameter of the specimen as it is elongated.

Having described the principle of this invention and the best mode in which I have contemplated applying that principle, I wish it to be understood that the examples described are illustrative only, and that other means can be employed without departing from the true scope of the invention.

What I claim as new and desire to secure by Letters Patent of the United States is:

1. A tensile test fixture for three-headed specimens comprising a first member, means to attach said first member to the center head of the specimen, second and third members, means to attach said second and third members to the two end heads of the specimen respectively, means for connecting the two end heads of the specimen to respective crossheads of a testing machine, whereby tensile load may be aplied to the specimen, and means to measure differences in displacement relative to said first member of said second and third members as load is applied to the specimen, said last-named means comprising gauging elements connected between said first and second member and between said first and third members, respectively, and not otherwise operatively connected to the specimen.

2. A tensile test fixture for testing three-headed specimens within enclosing apparatus, comprising a first member attached to the enclosing apparatus, means to attach said first member to the center head of the specimen to hold the specimen within the enclosing apparatus with the center head in fixed position relative to such apparatus, second and third members extending through ends of such apparatus and movable relative thereto, means to attach said second and third members to the two end heads of the specimen respectively, other members extending through respective ends of the enclosing apparatus, means to connect said other members to respective end heads of the specimen and to respective crossheads of a testing machine, whereby tensile load may be applied to the specimen, and means to measure differences in displacement relative to the enclosing apparatus of said second and third members as load is applied to the test specimen.

3. In a fixture for the tensile testing with a testing machine of specimens within enclosing apparatus, the combination of means for holding one head of the specimen in fixed position relative to the enclosing apparatus, a rod extending through one end of the enclosing apparatus, means to attach the inner end of said rod to another head of the specimen, a nest of at least two coaxial cylinders of which the outer is connected to said enclosing apparatus and the inner is connected to said rod, bearings to hold said cylinders in radial alignment while permitting free relative motion in their axial direction, and means to measure relative axial displacement of said cylinders.

4. In a fixture for the tensile testing of specimens with a testing machine, the combination of a furnace having an axial cylindrical inner chamber, a transverse member movable axially within said inner chamber, means for attaching one head of the specimen to said transverse member, an insulating sandwich comprising two transverse metal plates and a plate of heat-insulating material between the metal plates, said sandwich filling substantially the entire cross section of said inner chamber and being axially movable therein, rods attached to said transverse member and extending through the insulating sandwich and attached to the outer metal plate thereof, and other rods extending through one end of the furnace and through the insulating sandwich and attached to the inner metal plates thereof, so that the rods may transmit tensile load to the specimen while applying compressive load only to the heat-insulating material.

5. A test fixture for the tensile testing of three-headed specimens with a testing machine, comprising a furnace having an axial cylindrical inner chamber, a plurality of fixed rods extending axially through the inner chamber and attached to each end of the furnace, a fixed transverse member attached to said fixed rods, means for attaching the center head of the specimen to said fixed transverse member so that the center member is held in fixed position relative to the furnace, an axially movable transverse member on each side of the fixed transverse member, means for attaching the end heads of the specimen to respective ones of said movable transverse members, an insulating sandwich between each movable transverse member and its end of the furnace, each such sandwich comprising two transverse metal plates and a plate of heat-insulating material between the metal plates, said sandwiches each filling substantially the entire cross section of said inner chamber and being axially movable therein, rods attached to respective ones of said movable transverse members and extending through the adjacent insulating sandwich and attached to the outer metal plate thereof, other rods extending through respective ends of said furnace and through the adjacent insulating sandwich and attached to the inner metal plate thereof, means for connecting said other rods to respective crossheads of the testing machine, whereby tensile load may be applied to the specimen, unstressed rods extending through opposite ends of said furnace, means to connect said unstressed rods to respective end heads of the specimen, a nest of at least two coaxial cylinders at each end of said furnace, the outer cylinder of each such nest being connected to the furnace and the inner cylinder being connected to the unstressed rod at that end, bearings to hold said cylinders in radial alignment while permitting free relative motion in their axial direction, and means to measure changes in relative axial position to said cylinders.

6. A test fixture as in claim 5, in which each nest of cylinders has at least one strain gauge connected between the outer and the inner cylinders to measure changes in the relative axial position thereof.

7. A test fixture as in claim 5, in which the first nest of cylinders comprises three concentric cylinders while the second nest comprises at least two concentric cylinders, and in which mechanical coupling is provided between the middle cylinder of the first nest and the inner cylinder of the second nest so that the two move outward from the furnace by equal amounts, and in which a strain gauge is connected between the middle and inner cylinders of the first nest to measure the relative axial displacement thereof.

JACK D. LUBAHN.

REFERENCES CITED

The following references are of record in the file of this patent:

UNITED STATES PATENTS

| Number | Name | Date |
|---|---|---|
| 1,716,796 | Rockwell | June 11, 1929 |
| 2,075,968 | Von Heydekampf | Apr. 6, 1937 |
| 2,142,802 | Riepert | Jan. 3, 1939 |
| 2,279,368 | Dietert | Apr. 14, 1942 |
| 2,356,763 | Keinath | Aug. 29, 1944 |